United States Patent
Goddijn et al.

(10) Patent No.: US 12,493,591 B2
(45) Date of Patent: Dec. 9, 2025

(54) SYSTEMS AND METHODS FOR DATA HARMONIZATION

(71) Applicant: Palantir Technologies Inc., Denver, CO (US)

(72) Inventors: Alexander Goddijn, London (GB); Alexandre Guinaudeau, Sainghin-en-Mélantois (FR); Charles Sese, Geneve GE (CH); Obinna Ubah, London (GB); Naga Sri Subhash Nalluru, London (GB); Tomer Eldor, London (GB); Tim Zhong, New York, NY (US); Vainius Udra, Munich (DE); Yishak Tofik Mohammed, Jersey City, NJ (US)

(73) Assignee: Palantir Technologies Inc., Denver, CO (US)

(*) Notice: Subject to any disclaimer, the term of this patent is extended or adjusted under 35 U.S.C. 154(b) by 0 days.

(21) Appl. No.: 18/087,130

(22) Filed: Dec. 22, 2022

(65) Prior Publication Data
US 2024/0152493 A1    May 9, 2024

Related U.S. Application Data

(60) Provisional application No. 63/423,582, filed on Nov. 8, 2022.

(51) Int. Cl.
  *G06F 16/215*    (2019.01)
  *G06F 16/21*     (2019.01)
  *G06F 16/25*     (2019.01)

(52) U.S. Cl.
  CPC .......... *G06F 16/215* (2019.01); *G06F 16/212* (2019.01); *G06F 16/258* (2019.01)

(58) Field of Classification Search
  CPC ..... G06F 16/215; G06F 16/212; G06F 16/258
  USPC ......................................................... 707/692
  See application file for complete search history.

(56) References Cited

U.S. PATENT DOCUMENTS

| | | | |
|---|---|---|---|
| 7,987,088 B2 | 7/2011 | Moitra et al. | |
| 8,620,964 B2 | 12/2013 | Tsatsou et al. | |
| 9,430,114 B1* | 8/2016 | Dingman | G06F 16/25 |
| 10,095,716 B1* | 10/2018 | Juneja | G06F 40/242 |
| 2005/0050068 A1* | 3/2005 | Vaschillo | G06F 16/25 |
| 2005/0144166 A1* | 6/2005 | Chapus | G06F 16/258 |
| 2005/0149862 A1* | 7/2005 | Weitzman | G06F 40/143 |
| | | | 715/248 |

(Continued)

OTHER PUBLICATIONS

Calvanese, Diego, et al., "Conceptual Schema Transformation in Ontology-Based Access", EKAW 2018, Nancy, France, Nov. 12-16, 2018, pp. 50-67.*

(Continued)

*Primary Examiner* — Robert Stevens
(74) *Attorney, Agent, or Firm* — Faegre Drinker Biddle & Reath LLP

(57) ABSTRACT

System and method for data cleaning and/or transformation according to certain embodiments. For example, a method includes: receiving a raw source dataset including one or more data types; matching the raw source dataset to a target schema corresponding to a domain, the target schema including one or more standardized variables; and transforming the one or more data types in the raw source dataset to the one or more standardized variables.

14 Claims, 9 Drawing Sheets

(56) References Cited

U.S. PATENT DOCUMENTS

| | | | |
|---|---|---|---|
| 2008/0147698 A1* | 6/2008 | Gustafsson | G06F 16/258 |
| 2012/0109966 A1 | 5/2012 | Liang et al. | |
| 2013/0117217 A1* | 5/2013 | Bhide | G06F 16/254 |
| | | | 707/602 |
| 2013/0238351 A1* | 9/2013 | Burns | G16H 10/20 |
| | | | 705/2 |
| 2013/0325770 A1 | 12/2013 | Heidasch | |
| 2015/0006432 A1 | 1/2015 | Grosset et al. | |
| 2015/0039611 A1 | 2/2015 | Deshpande et al. | |
| 2016/0224645 A1 | 8/2016 | Dang | |
| 2016/0232216 A1 | 8/2016 | Wurzer | |
| 2016/0335544 A1 | 11/2016 | Bretschneider et al. | |
| 2017/0286456 A1* | 10/2017 | Wenzel | G16H 10/20 |
| 2018/0101584 A1* | 4/2018 | Pattnaik | G06F 16/86 |
| 2018/0173795 A1* | 6/2018 | Cobbett | G06F 16/316 |
| 2018/0285391 A1* | 10/2018 | Juneja | G06F 16/2282 |
| 2019/0286620 A1* | 9/2019 | Al-Haimi | G06F 16/211 |
| 2020/0409946 A1* | 12/2020 | Ranghabhatla | G06F 16/221 |
| 2022/0179833 A1* | 6/2022 | Ramalingam | G06F 16/2237 |
| 2022/0342901 A1* | 10/2022 | Aggarwal | G06F 40/40 |

OTHER PUBLICATIONS

Calvanese, Diego, et al., "ADaMaP: Automatic Alignment of Relational Data Sources Using Mapping Patterns", CAiSE 2021, Melbourne, VIC< Australia, Jun. 28-Jul. 2, 2021, pp. 193-209.*

Bernstein, Philip A., et al., "Model Management 2.0: Manipulating Richer Mappings", SIGMOD '07, Beijing, China, Jun. 12-14, 2007, pp. 1-12.*

Ontology (information science), Wikipedia, Dec. 15, 2015, downloaded from: en.wikipedia.org/wiki/Ontology_(information_science), pp. 1-17.*

Papotti, Paolo, et al., "Schema exchange: Generic mappings for transforming data and metadata", Data & Knowledge Engineering, vol. 68, Issue 7, Jul. 2009, pp. 665-682.*

Wimmer, R., et al., "Implementation of Advanced BIM-Based Mapping Rules for Automated Conversions to Modelica", Proceedings of the 14th IBPSA Conference, Hyderabad, India, Dec. 7-9, 2015, pp. 419-426.*

Almeida, João Rafael, et al., "A methodology for cohort harmonization in multicentre clinical research", Informatics in Medicine Unlocked, vol. 27, 100760, ScienceDirect, © 2021, 9 pages.*

* cited by examiner

FIG. 5

Target Scheme Management Tool  |  Configure Target Variable  |  Review Versions  |  Version Details

Variables Status
Configure Variable

Filters

Domain (7)
- ☐ D1   61
- ☐ D2   52
- ☐ D3   48
- ☐ D4   47
- ☐ D5   43

Show more

Variable name (295)
- ☐ V1   7
- ☐ V2   7
- ☐ V3   7
- ☐ V4   6
- ☐ V5   6

Show more

In Variable and domain mapping (2)
- ☐ Yes   292
- ☐ No    34

Keep in output (2)
- ☐ Yes   255
- ☐ No    77

Core (5)
- ☐ No Value   332

Variables Overview — 530

Publish changes as a version
● Add additional variable
Edits History

| Variable name | Domain | Variable Description | In Variable and Domain mapping | In contact mapping | Keep in Output | Map from Code |
|---|---|---|---|---|---|---|
| ☐ V1 | D1 | Description 1 | Yes | Yes | Yes | Yes |
| ☐ V2 | D2 | Description 2 | Yes | Yes | Yes | Yes |
| ☐ V3 | D3 | Description 3 | Yes | Yes | Yes | Yes |
| ☐ V4 | D4 | Description 4 | Yes | Yes | Yes | Yes |
| ☐ V5 | D5 | Description 5 | Yes | Yes | Yes | Yes |
| ☐ V6 | D6 | Description 6 | Yes | Yes | Yes | Yes |
| ☐ V7 | D7 | Description 7 | Yes | Yes | Yes | Yes |
| ☐ V8 | D8 | Description 8 | Yes | Yes | Yes | Yes |
| ☐ V9 | D9 | Description 9 | Yes | Yes | Yes | Yes |
| ☐ V10 | D10 | Description 10 | Yes | Yes | Yes | Yes |
| ☐ V11 | D11 | Description 11 | Yes | Yes | Yes | Yes |

500 / 532

| Possible database to map to this domain | | |
|---|---|---|
| ▵ Domain Name | Mapping Column | Dataset Count |
| DS1 | Possible | 1874 |
| DS2 | Possible | 1090 |
| DS3 | Possible | 1020 |
| DS4 | Possible | 411 |
| DS5 | Possible | 258 |
| DS6 | Possible | 267 |
| DS7 | Possible | 259 |

FIG. 6

☑ Editing Rule     ⊕ Create new ↩ Reset 🗑 Delete ⇧ Submit Changes    ▦ Rule History & Details Rule Name* ⓘ

Rule Description* ⓘ

Rule Template* ⓘ

Tag Type* ⓘ

Tag Value* ⓘ

SYSTEMS AND METHODS FOR DATA HARMONIZATION

CROSS REFERENCE TO RELATED APPLICATIONS

This application claims priority to U.S. Provisional Application No. 63/423,582, filed Nov. 8, 2022, incorporated by reference herein for all purposes.

TECHNICAL FIELD

Certain embodiments of the present disclosure are directed to systems and methods for data cleaning and/or data transformation. More particularly, some embodiments of the present disclosure provide systems and methods for batch data cleaning and/or data transformation.

BACKGROUND

A large amount of data has become available for analysis and visualization. In some examples, data can be received or acquired from multiple sources. In certain examples, data processing is performed, such as modifying data, cleaning data, transforming data, merging data, and/or the like.

Hence it is desirable to improve the techniques for data transformation and/or data cleaning.

SUMMARY

Certain embodiments of the present disclosure are directed to systems and methods for data cleaning and/or data transformation. More particularly, some embodiments of the present disclosure provide systems and methods for batch data cleaning and/or data transformation.

In some embodiments, a method for data harmonization for a domain, the method comprising: receiving a raw source dataset including one or more data types; matching the raw source dataset to a target schema corresponding to the domain, the target schema including one or more standardized variables; and transforming the one or more data types in the raw source dataset to the one or more standardized variables; wherein the method is performed using one or more processors.

In certain embodiments, a system for data harmonization for a domain, the system comprising: one or more memories storing instructions thereon; one or more processors configured to execute the instructions and perform operations comprising: receiving a raw source dataset including one or more data types; matching the raw source dataset to a target schema corresponding to the domain, the target schema including one or more standardized variables; and transforming the one or more data types in the raw source dataset to the one or more standardized variables.

In some embodiments, a method for data harmonization, the method comprising: receiving a plurality of source datasets including one or more data types; receiving a target schema, the target schema including one or more standardized variables; mapping the plurality of source datasets to the plurality of standardized data structures in the target schema using a set of dataset mapping rules, and transforming the one or more data types in the plurality of source datasets to the one or more standardized variables using a set of variable mapping rules, at least one dataset mapping rule in the set of dataset mapping rules being different from any variable mapping rule in the set of variable mapping rules; wherein the method is performed using one or more processors.

BRIEF DESCRIPTION OF THE DRAWINGS

FIG. 5 is a user interface for an example target schema management tool, according to certain embodiments of the present disclosure.

FIG. 6 is a user interface for an example mapping tool (e.g., a dataset and variable mapping tool), according to certain embodiments of the present disclosure.

FIG. 7 is a user interface for an example content mapping tool, according to certain embodiments of the present disclosure.

DETAILED DESCRIPTION

Figure 1:
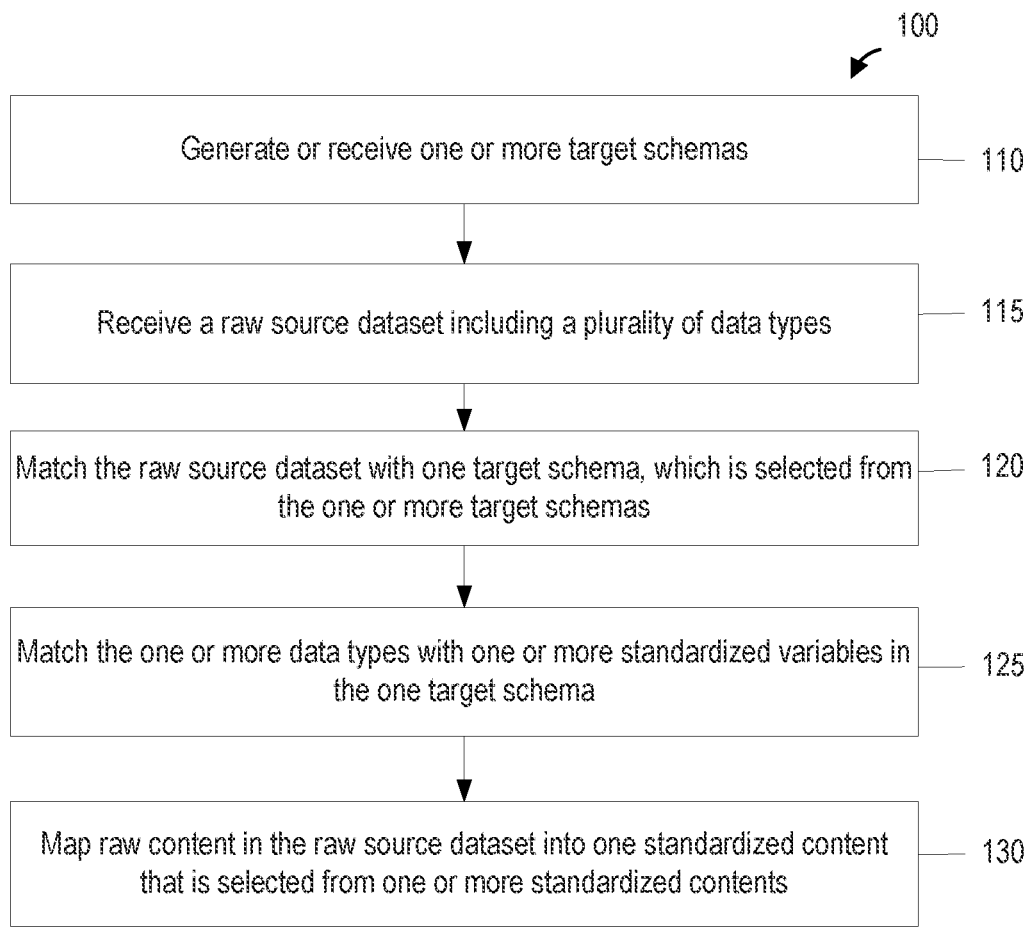
FIG. 1 is a simplified diagram showing a method for data harmonization according to certain embodiments of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g., 1 to 5 includes 1, 1.5, 2, 2.75, 3, 3.80, 4, and 5) and any range within that range.

Although illustrative methods may be represented by one or more drawings (e.g., flow diagrams, communication flows, etc.), the drawings should not be interpreted as implying any requirement of, or particular order among or between, various steps disclosed herein. However, some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," or "group" of items (e.g., inputs, algorithms, data values, etc.) may include one or more items and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information. As used herein, the term "receive" or "receiving" means obtaining from a data repository (e.g., database), from another system or service, from another software, or from another software component in a same software. In certain embodiments, the term "access" or "accessing" means retrieving data or information, and/or generating data or information.

At least some embodiments of the present disclosure are directed to systems and methods for batch data cleaning and transformation, for example, reshaping into pre-defined standard target schemas and content values. In certain embodiments, the systems and methods use a rule-based approach. According to some embodiments, data-driven analysis and usage is often limited by the available unified data assets. As an example, data assets may include a plentitude of datasets in various formats, schemas, and standards. In certain embodiments, data integration and standardization of large scales of datasets from various formats and shapes is challenging, and requires collaboration between complex technical data cleaning expertise, and innovative ways to apply cleaning steps at bulk to a large scale of data without access to infinite resources to manually reshape each dataset individually. In some examples, the data integration and standardization may involve data subject-matter experts who are familiar with the data and its interpretation, who may not be able to write data pipelines and transformations themselves.

At least certain embodiments of the present disclosure are directed to systems for bulk cleaning and transforming data at scale (e.g., data harmonization systems). In some examples, the data harmonization system includes a non-technical user-friendly user interface. In certain embodiments, the data transformation system can be used in various contexts, for example, data-driven health sciences research on clinical trials. As an example, medical research and development organizations often have access to many (thousands or tens of thousands of) clinical trials, but all in varying formats, structures, terminologies (e.g., naming) and even languages, which prevents them from analyzing multiple trials (e.g., at once). In some embodiments, the data harmonization system, also referred to as a data harmonization suite, is built for and used by major medical research organizations to help them harmonize their own sets of trials data, for example, consisting of over 100,000 datasets, into a unified, standardized data asset. In certain embodiments, the data harmonization suite includes a scalable rule-based system for non-technical data experts to define and execute rules with a non-technical user interface and workflow.

According to some embodiments, the data harmonization suite comprises a set of interlocking, interoperable tools which facilitate the mapping of data in multiple levels. In certain embodiments, working in concert, the suite's tools include one or more levels of mapping of (e.g., allow users to): map source datasets to standard datasets (e.g., standard canonical datasets), map source columns within these datasets to standardized variables of the standard datasets; and standardize content inside the original datasets (e.g., source datasets) from various raw strings expressing the same concept, to a standardized string for that concept.

According to certain embodiments, this effectively allows to map incoming raw datasets in various formats into a pre-defined schema, or referred to as an ontology, and also standardizing their content to be normalized across all data (e.g., all datasets). In some embodiments, for each of these levels of mapping, the suite provides dedicated interfaces which allow experts to focus on one level at a time. In certain embodiments, on top of being able to harmonize to standardize data model, a target structure (e.g., standardized datasets and variables) as well as the target content are all customizable and editable as part of the data harmonization suite, allowing a user (e.g., an organization) to define its own proprietary lists of targets and semantics values to fit any specific needs and structure.

FIG. 1 is a simplified diagram showing a method 100 for data harmonization according to certain embodiments of the present disclosure. This diagram is merely an example. One of ordinary skill in the art would recognize many variations, alternatives, and modifications. The method 100 for data harmonization includes processes 110, 115, 120, 125, and 130. Although the above has been shown using a selected group of processes for the method 100 for data harmonization, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 100 are performed by a system (e.g., the computing system 900). In certain examples, some or all processes (e.g., steps) of the method 100 are performed by a computer and/or a processor directed by a code. For example, a computer includes a server computer and/or a client computer (e.g., a personal computer). In some examples, some or all processes (e.g., steps) of the method 100 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at the process 110, a data harmonization system is configured to receive or generate one or more target schemas. For example, the data harmonization system is configured to use a target schema management tool (e.g., the target schema management tool 500 as illustrated in FIG. 5). In certain embodiments, at the process 115, the data harmonization system is configured to receive a raw source dataset. In some embodiments, the raw source dataset is received from a data source. In certain embodiments, the raw source dataset includes a plurality of raw datasets, such as a first source dataset and a second source dataset.

According to certain embodiments, at the process 120, the data harmonization system is configured to match the raw source dataset to one target schema, which is selected from one or more target schemas. In some embodiments, the data harmonization system is configured to select one target schema from the one or more target schemas based at least in part on a domain, for example, a domain identified from the raw source dataset. In certain embodiments, the data harmonization system is configured to select one target schema from the one or more target schemas based at least in part on inputs including, for example, user inputs, inputs via software interfaces (e.g., application programming interfaces (APIs), web service interfaces, etc.). In some embodiments, the data harmonization system is configured to select one target schema from the one or more target schemas stored in one or more data repository and/or via one or more software interfaces. In certain embodiments, the data harmonization system is configured to select one target schema from one or more target schemas using one or more computational models.

In some embodiments, a model, also referred to as a computing model, includes a model to process data. A model includes, for example, an AI model, a machine learning (ML) model, a deep learning (DL) model, an image processing model, an algorithm, a rule, other computing models, and/or a combination thereof. In certain embodiments, a raw dataset includes one or more data types. In some embodiments, the target schema includes one or more standardized data structures (e.g., one or more standardized tables). In certain embodiments, the target schema includes one or more standardized variables (e.g., one or more standardized columns). In some embodiments, the target schema includes one or more standardized contents (e.g., one or more standardized content values, one or more standardized codes, etc.).

According to certain embodiments, at the process 125, the data harmonization system is transforming the one or more data types in the raw source datasets to one or more standardized variables. In some embodiments, the raw source dataset includes a plurality of source datasets including, for example, a first source dataset and a second source dataset. In certain embodiments, a standardized data structure includes at least one standardized variable of the one or more standardized variables. In some embodiments, at least two standardized data structures in the target schema include the same standardized variable. In certain embodiments, at least two standardized data structures in the target schema include two or more same standardized variables.

According to some embodiments, the data harmonization system maps the plurality of source datasets to the plurality of standardized data structures in the target schema. In certain embodiments, the data harmonization system maps the plurality of source datasets to the plurality of standardized data structures in the target schema using a set of dataset mapping rules. In some embodiments, the first source dataset is different from the second source dataset. In certain embodiments, the data harmonization system maps the first source dataset to a standardized data structure and the second source dataset to the same standardized data structure.

According to certain embodiments, the data harmonization system is configured to transform the plurality of data types in the raw source dataset to the one or more standardized variables. In some embodiments, the data harmonization system is configured to transform the plurality of data types in the raw source dataset to the one or more standardized variables using a set of variable mapping rules. In certain embodiments, at least one dataset mapping rule in the set of dataset mapping rules is different from any one variable mapping rule in the set of variable mapping rules.

According to some embodiments, the one or more standardized data structures include a plurality of standardized data structure and the set of variable mapping rules include a variable mapping rule associated with at least two of the plurality of standardized data structures. In some embodiments, the data harmonization system is configured to apply one variable mapping rule to at least two datasets in the raw source datasets. In certain embodiments, the data harmonization system is configured to apply two or more variable mapping rules to at least two datasets in the raw source datasets.

In some embodiments, at the process 130, the data harmonization system is configured to map one or more raw contents in the raw source dataset to the one or more standardized contents. In certain embodiments, the data harmonization system is configured to map one or more raw contents in the raw source dataset to the one or more standardized contents using a set of content mapping rules. In some embodiments, the one or more standardized variables include a plurality of standardized variables, and the set of content mapping rules include a content mapping rule associated with at least two of the plurality of standardized variables. In certain embodiments, one content mapping rule of the set of content mapping rules is associated with at least two of the plurality of standardized data structures. In some embodiments, the data harmonization system is configured to apply one or more content mapping rules in the set of content mapping rules to at least two data types (e.g., variables) in the raw source datasets. In certain embodiments, the data harmonization system is configured to apply one or more content mapping rules in the set of content mapping rules to at least two datasets in the raw source datasets. In some embodiments, the data harmonization system is configured to map raw textual content in the raw source dataset to one standardized content of one or more standardized contents.

Figure 2:
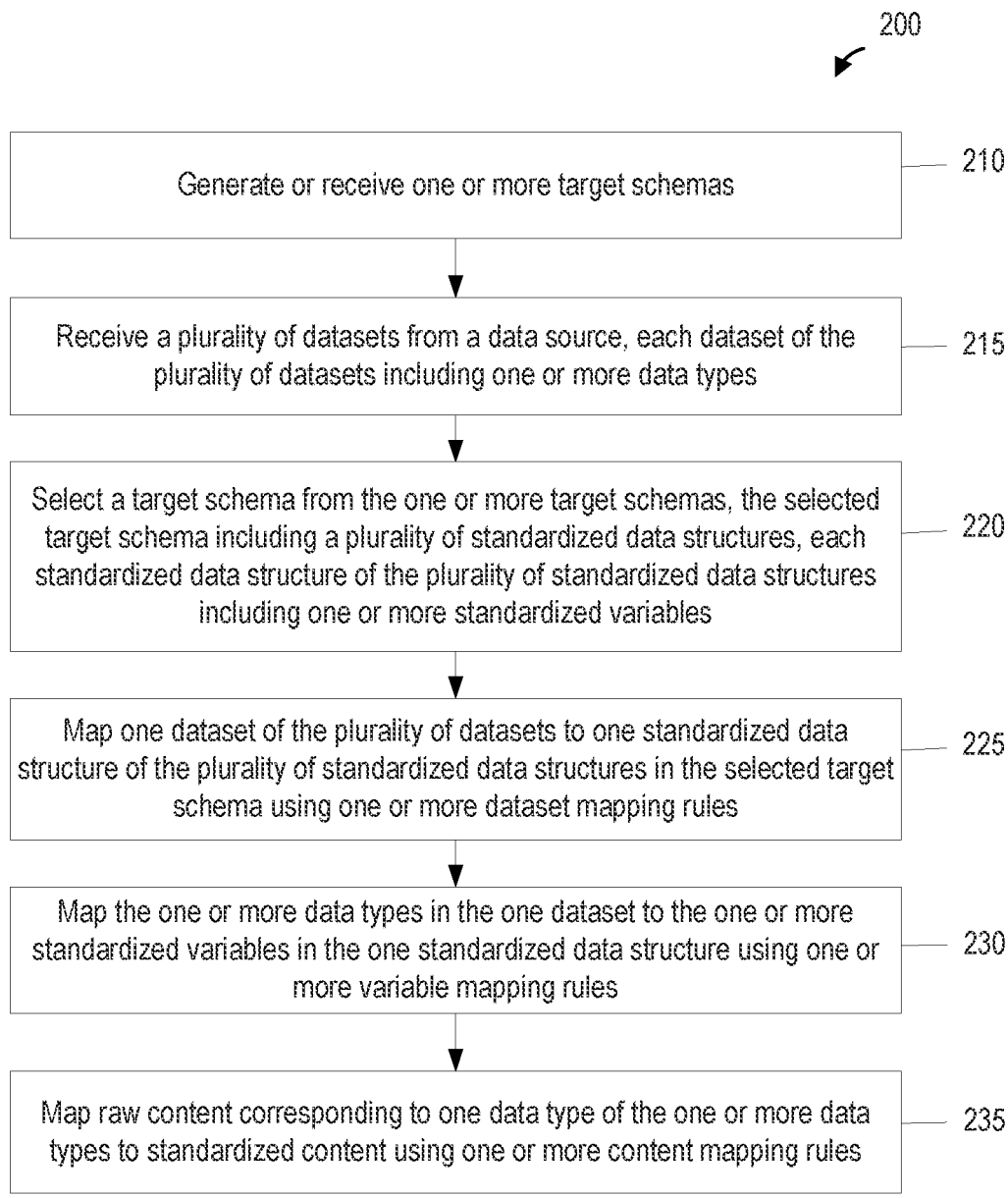
FIG. 2 s a simplified diagram showing a method for data harmonization according to certain embodiments of the present disclosure.

FIG. 2 s a simplified diagram showing a method 200 for data harmonization according to certain embodiments of the present disclosure. This diagram is merely an example. One of ordinary skill in the art would recognize many variations, alternatives, and modifications. The method 200 for data harmonization includes processes 210, 215, 220, 225, 230, and 235. Although the above has been shown using a selected group of processes for the method 200 for data harmonization, there can be many alternatives, modifications, and variations. For example, some of the processes may be expanded and/or combined. Other processes may be inserted into those noted above. Depending upon the embodiment, the sequence of processes may be interchanged with others replaced. Further details of these processes are found throughout the present disclosure.

In some embodiments, some or all processes (e.g., steps) of the method 200 are performed by a system (e.g., the computing system 900). In certain examples, some or all processes (e.g., steps) of the method 200 are performed by a computer and/or a processor directed by a code. For example, a computer includes a server computer and/or a client computer (e.g., a personal computer). In some examples, some or all processes (e.g., steps) of the method 200 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

According to some embodiments, at the process 210, a data harmonization system is configured to receive or generate one or more target schemas. For example, the data harmonization system is configured to use a target schema management tool (e.g., the target schema management tool 500 as illustrated in FIG. 5). In certain embodiments, at the process 215, the data harmonization system is configured to receive a plurality of datasets from a data source, each dataset of the plurality of datasets including one or more data types. In some embodiments, the raw source dataset is received from a data source. In certain embodiments, the raw source dataset includes a plurality of raw datasets, such as a first source dataset and a second source dataset. In some examples, the first source dataset is received from a first data source and the second source dataset is received from a second data source different from the first data source. In certain embodiments, the first source dataset has a data structure different from the data structure of the second source dataset.

According to certain embodiments, at the process 220, the data harmonization system is configured to select a target schema from the one or more target schemas. In some embodiments, the selected target schema includes a plurality of standardized data structures. In certain embodiments, each standardized data structure of the plurality of standardized data structures includes one or more standardized variables.

In some embodiments, the data harmonization system is configured to select one target schema from the one or more target schemas stored in one or more data repository and/or via one or more software interfaces. In certain embodiments, the data harmonization system is configured to select one target schema from one or more target schemas using one or more computational models.

In certain embodiments, a raw dataset includes one or more data types. In some embodiments, the target schema includes one or more standardized data structures (e.g., one or more standardized tables). In certain embodiments, the target schema includes one or more standardized variables (e.g., one or more standardized columns). In some embodiments, the target schema includes one or more standardized contents (e.g., one or more standardized content values, one or more standardized codes, etc.).

According to some embodiments, at the process 225, the data harmonization system maps one dataset of the plurality of datasets to one standardized data structure of the plurality of standardized data structures in the selected target schema using one or more dataset mapping rules. In certain embodiments, the data harmonization system is configured to match the raw source dataset to one target schema, which is selected from one or more target schemas. In some embodiments, the data harmonization system is configured to select one target schema from the one or more target schemas based at least in part on a domain, for example, a domain identified from the raw source dataset. In certain embodiments, the data harmonization system is configured to select one target schema from the one or more target schemas based at least in part on inputs including, for example, user inputs, inputs via software interfaces (e.g., application programming interfaces (APIs), web service interfaces, etc.).

According to some embodiments, the data harmonization system maps the plurality of source datasets to the plurality of standardized data structures in the target schema. In certain embodiments, the data harmonization system maps the plurality of source datasets to the plurality of standardized data structures in the target schema using a set of dataset mapping rules. In some embodiments, the first source dataset is different from the second source dataset. In certain embodiments, the data harmonization system maps the first source dataset to one standardized data structure of the plurality of standardized data structures and the second source dataset to the same standardized data structure the plurality of standardized data structures.

According to certain embodiments, at the process 230, the data harmonization system is configured to map the one or more data types in the one dataset to the one or more standardized variables in the one standardized data structure using one or more variable mapping rules. In some embodiments, the raw source dataset includes a plurality of source datasets including, for example, a first source dataset and a second source dataset. In certain embodiments, a standardized data structure includes at least one standardized variable of the one or more standardized variables. In some embodiments, the target schema includes one or more standardized variables (e.g., one or more standardized columns). In certain embodiments, the target schema includes one or more standardized contents (e.g., one or more standardized content values, one or more standardized codes, etc.).

According to some embodiments, the data harmonization system is configured to transform the one or more data types in the raw source dataset to the one or more standardized variables. In some embodiments, the data harmonization system is configured to transform the one or more data types in the raw source dataset to the one or more standardized variables using a set of variable mapping rules. In certain embodiments, at least one dataset mapping rule in the set of dataset mapping rules is different from any one variable mapping rule in the set of variable mapping rules.

According to certain embodiments, the one or more standardized data structures include a plurality of standardized data structures and the set of variable mapping rules include a variable mapping rule associated with at least two of the plurality of standardized data structures. For example, the "name" mapping rule is associated with both "patient" dataset and the "doctor" dataset. In some embodiments, the data harmonization system is configured to apply one variable mapping rule to at least two datasets in the raw source datasets. In certain embodiments, the data harmonization system is configured to apply two or more variable mapping rules to at least two datasets in the raw source datasets.

According to some embodiments, at the process 235, the data harmonization system is configured to map one or more raw contents in the raw source dataset to the one or more standardized contents. In certain embodiments, the data harmonization system is configured to map one or more raw contents in the raw source dataset to the one or more standardized contents using a set of content mapping rules. In some embodiments, the one or more standardized variables include a plurality of standardized variables, and the set of content mapping rules include a content mapping rule associated with at least two of the plurality of standardized variables.

In certain embodiments, one content mapping rule of the set of content mapping rules is associated with at least two of the plurality of standardized data structures. In some embodiments, the data harmonization system is configured to apply one or more content mapping rules in the set of content mapping rules to at least two data types (e.g., variables) in the raw source datasets. In certain embodiments, the data harmonization system is configured to apply one or more content mapping rules in the set of content mapping rules to at least two datasets in the raw source datasets. In some embodiments, the data harmonization system is configured to map raw textual content in the raw source dataset to one standardized content of one or more standardized contents.

Figure 3:
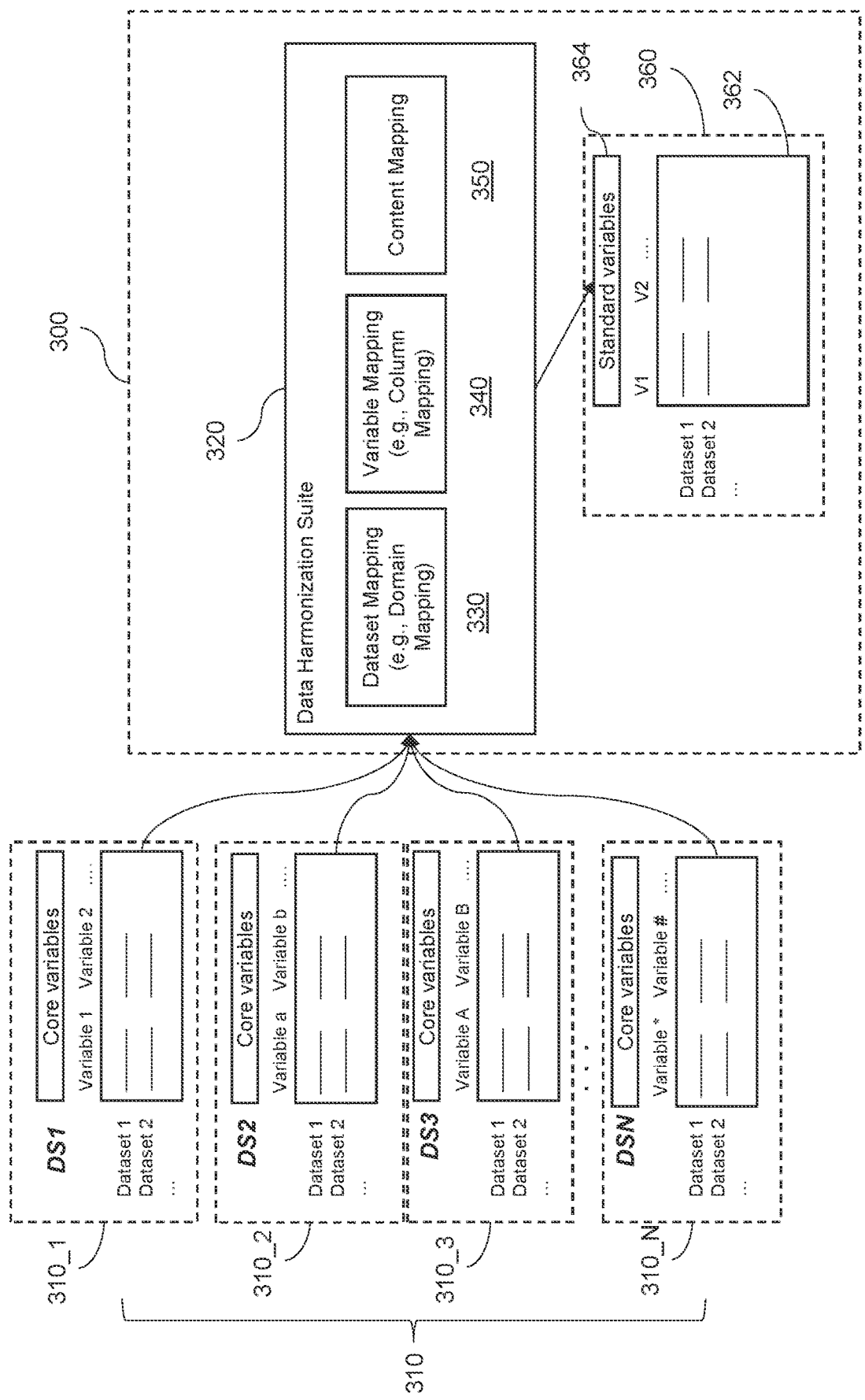
FIG. 3 is an example data harmonization architecture for data harmonization, according to certain embodiments of the present disclosure.

FIG. 3 is an example data harmonization architecture 300 for data harmonization, according to certain embodiments of the present disclosure. FIG. 3 is merely an example. One of ordinary skill in the art would recognize many variations, alternatives, and modifications. The embodiments corresponding to FIG. 3 can be combined, modified, and/or substituted by one or more other embodiments described herein. According to some embodiments, the data harmonization architecture 300 includes a data harmonization suite (e.g., a data harmonization system) 320 and a target schema 360. In certain embodiments, the data harmonization suite 320 includes a dataset mapping processor 330, a variable mapping processor 340, and a content mapping processor 350.

In some embodiments, the data harmonization suite 320 receives data from one or more data sources 310 (e.g., a data source 310_1, a data source 310_2, a data source 310_3, . . . , a data source 310_N). In certain embodiments, a data source 310 provides one or more datasets, each dataset includes one or more data types. In some embodiments, the data source 310 includes one or more content data (e.g., raw contents), also referred to as content values or contents. In certain embodiments, the data harmonization system 320 receives one or more datasets, also referred to as raw source datasets, from the one or more data source(s) 310.

According to some embodiments, the dataset mapping processor 330 is configured to generate, edit, modify, and/or delete dataset mapping rules. In certain embodiments, the dataset mapping processor 330 is configured to generate, edit, modify, and/or delete dataset mapping rules via user inputs. In certain embodiments, the dataset mapping processor 330 is configured to generate, edit, modify, and/or delete dataset mapping rules via inputs from software interfaces (e.g., application programming interfaces (APIs), web services, etc.). In some embodiments, the dataset mapping processor 330 is configured to generate, edit, modify, and/or delete dataset mapping rules via computational models.

According to some embodiments, the variable mapping processor 340 is configured to generate, edit, modify, and/or delete variable mapping rules (e.g., column mapping rules). In certain embodiments, the variable mapping processor 340 is configured to generate, edit, modify, and/or delete variable mapping rules via user inputs. In certain embodiments, the variable mapping processor 340 is configured to generate, edit, modify, and/or delete variable mapping rules via inputs from software interfaces (e.g., application programming interfaces (APIs), web services, etc.). In some embodiments, the variable mapping processor 340 is configured to generate, edit, modify, and/or delete variable mapping rules via computational models.

According to certain embodiments, the dataset mapping rules include a dataset mapping rule to map a dataset (e.g., patient dataset) to a standardized data structure (e.g., a standardized table, a person table). In some embodiments, the dataset mapping rules include a dataset mapping rule to merge two or more datasets to a standardized data structure. In certain embodiments, the dataset mapping rules include a dataset mapping rule to map a dataset to two or more standardized data structures. In some embodiments, the dataset mapping processor 330 defines sets of rules which map raw source datasets to their matching standardized data structures (e.g., with standard dataset names). In certain embodiments, the dataset mapping processor 330 is configured to match the raw datasets into standardized tables (e.g., standardized data structures) associated with a pre-defined schema.

In certain embodiments, the variable mapping rules include a rule to map a data type (e.g., a source column, names, addresses, streets) to a standardized variable (e.g., a standardized column, a name column). In some embodiments, the variable mapping rules include a rule to merge two or more data types to a standardized variable (e.g., a standardized column). In certain embodiments, the dataset mapping rules include a rule to map a data type to two or more standardized variables. In some embodiments, the variable mapping processor 340 defines sets of rules which map raw source data types (e.g., source columns) into standardized target variables. In certain embodiments, the variable mapping processor 340 is configured to match raw source data types with pre-defined variables in the standardized table in the target schema.

According to certain embodiments, the data harmonization system 320 explores rules, data, and/or configurations either from the source datasets perspective, or from the target schema perspective. In some embodiments, the data harmonization system 320 identifies gaps (e.g., missing data structures, missing variables) in the target schema 360. In certain embodiments, the target schema 360 includes one or more standardized datasets 362 and/or one or more standardized variables 364. In some embodiments, the data harmonization system 320 identifies missing data structures and/or missing variables in the target schema based at least in part upon inputs (e.g., user inputs, system inputs, inputs via software interfaces). In some embodiments, the data harmonization system 320 is configured to identify missing data structures and/or missing variables by analyzing and/or reviewing proposed schemas (e.g., candidate target schemas), for example, based at least in part upon the raw datasets from the data sources 310.

According to some embodiments, the data harmonization system 320 are configured to separate dataset mapping rules (e.g., data structure mapping rules) from variable mapping rules (e.g., column mapping rules), for example, to achieve higher efficiency. In certain embodiments, at least one variable mapping rule applies to two or more datasets (e.g., raw source datasets). In some embodiments, one variable mapping rule is associated with all applicable standardized datasets 362 including the variable corresponding to the variable mapping rule in the target schema 360. In certain embodiments, the data harmonization system 320 is configured to define rules for finding and matching datasets to standardized target schema (e.g., corresponding to target domains), separately from the rules which find and match columns to standardized target variables. In some embodiments, the separation of dataset mapping rules from variable mapping rules enables scaling of rules sets, for example, in cases where the same column name appears in multiple different datasets (e.g., a patient table including a name column, a doctor table including a name column, etc.). In certain embodiments, the data harmonization system 320 does not need to define different variable rules for each dataset (e.g., dataset:column). In some embodiments, a variable mapping rule applies to two or more data structures (e.g., two or more standardized tables, two or more datasets, all datasets). For example, the variable "SUBJECT_ID" may appear in almost all datasets, and the system facilitates creating one single rule for finding all the possible matches to this variable, which then applies to all datasets.

According to certain embodiments, the dataset mapping processor 330 is configured to transform one or more datasets from the data sources 310 to one or more standardized datasets 362 in the target schema 360. In some embodiments, the dataset mapping processor 330 is configured to transform one or more datasets from the data sources 310 to one or more target datasets 362 in the target schema 360 using one or more dataset mapping rules. In certain embodiments, the variable mapping processor 340 is configured to transform one or more data types in the raw datasets from the data sources 310 to one or more standardized variables 364 in the target schema 360. In some embodiments, the variable mapping processor 340 is configured to transform one or more data types in the raw datasets from the data sources 310 to one or more standardized variables 364 in the target schema 360 using one or more variable mapping rules.

According to some embodiments, the content mapping processor 350 is configured to add, edit, modify, and/or delete content mapping rules (e.g., content value mapping rules). In certain embodiments, the content mapping processor 350 is configured to generate and/or edit mapping rules to standardize the textual content values contained in the data (e.g., raw datasets). In some embodiments, the content mapping processor 350 is configured to generate and/or edit mapping rules to standardize the textual content values contained in the data (e.g., raw datasets) based at least in part on user inputs. In some embodiments, the content mapping processor 350 is configured to generate and/or edit mapping rules to standardize the textual content values contained in the data (e.g., raw datasets) based at least in part on inputs received from software interface(s) (e.g., application programming interfaces (APIs), web services, etc.).

In some embodiments, the content mapping processor 350 is configured to generate and/or edit mapping rules to standardize the textual content values contained in the data (e.g., raw datasets) via computational models (e.g., machine learning (ML) models, deep learning (DL) models, supervised ML models, unsupervised ML models, etc.). In certain embodiments, the content mapping processor 350 is configured to map one or more content in the raw datasets from the data sources 310 to one or more standardized content associated with the target schema 360. In some embodiments, the content mapping processor 350 is configured to map one or more content in the raw datasets from the data sources 310 to one or more standardized content associated with the target schema 360 using one or more content mapping rules.

In some embodiments, the content mapping processor 350 is configured to consolidates one or more unique content values per variable and supports the generation of rules which map original source values across datasets to a given standardized target value (e.g., codes). In certain embodiments, the content mapping processor 350 is can also define target values within the target schema. For example, while the original data may refer to a gender of a patient as either "female", "woman", "F", "W", "femme", "0", or "1" all to mean the same concept—the content mapping tool 700 and/or the data harmonization system helps consolidate those different representations into a single standard representation ("Female"). In some embodiments, this enables later data analysis to be made on all data at once.

Figure 4:
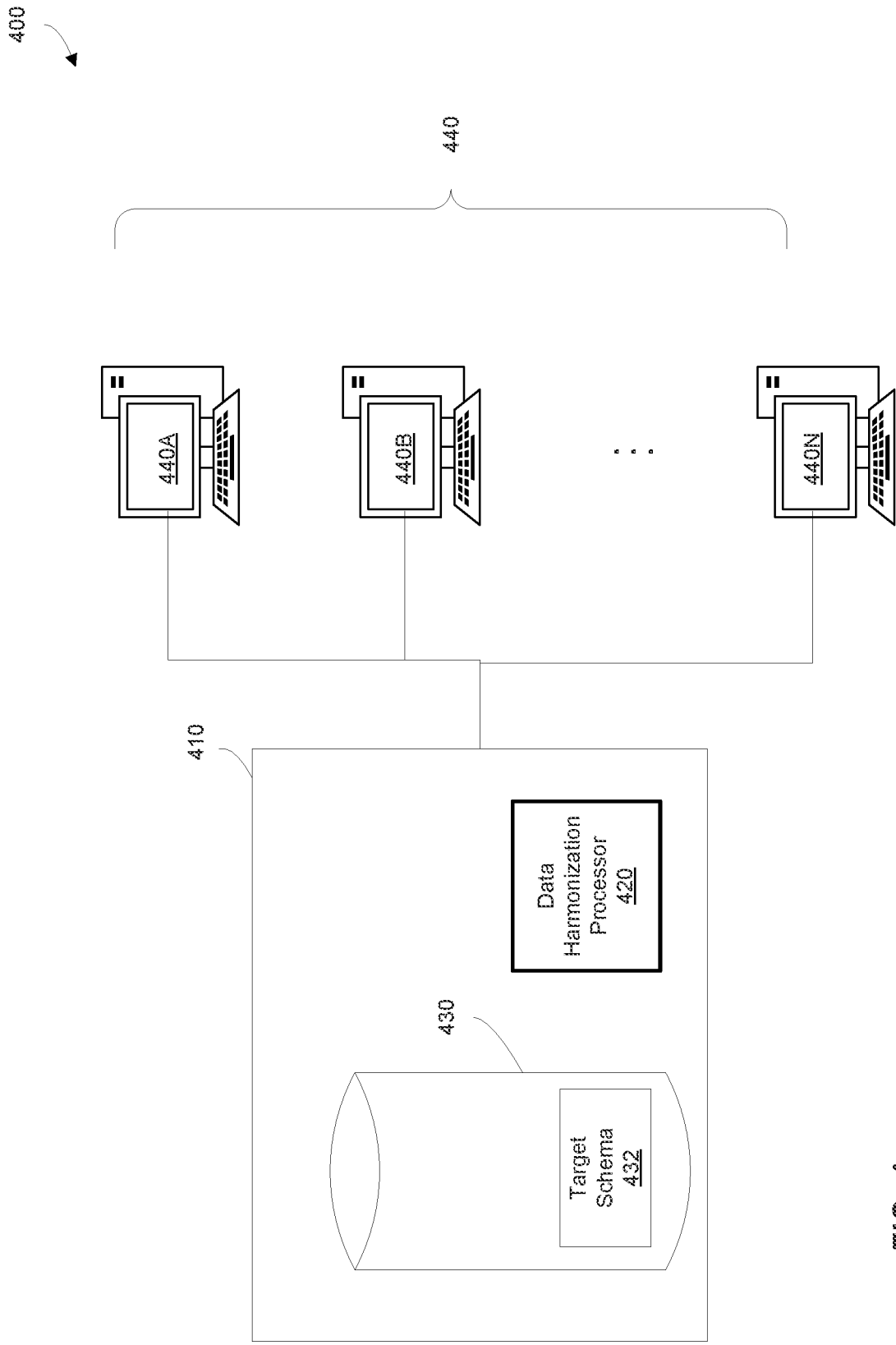
FIG. 4 is an illustrative example of data harmonization environment, according to certain embodiments of the present disclosure.

FIG. 4 is an illustrative example of data harmonization environment 400, according to certain embodiments of the present disclosure. FIG. 4 is merely an example. One of the ordinary skilled in the art would recognize many variations, alternatives, and modifications. According to certain embodiments, the data harmonization environment 400 includes a data harmonization system 410 (e.g., a distributed system) and one or more data sources 440 (e.g., data source 440A, data source 440B, . . . , data source 440N). In some embodiments, the data harmonization system 410 incudes one or more data harmonization processor 420 (e.g., distributed processors) and one or more memories 430. In certain embodiments, the one or more memories 430 include a target schema repository 432. Although the above has been shown using a selected group of components in the data harmonization environment 400, there can be many alternatives, modifications, and variations. For example, some of the components may be expanded and/or combined. Other components may be inserted into those noted above. Depending upon the embodiment, the arrangement of components may be interchanged with others replaced. Further details of these components are found throughout the present disclosure.

According to some embodiments, the data harmonization system 410 and/or the data harmonization processor 420 is configured to receive or generate one or more target schemas. For example, the data harmonization system 410 and/or the data harmonization processor 420 is configured to use a target schema management tool. In certain embodiments, the data harmonization system 410 and/or the data harmonization processor 420 is configured to receive a plurality of datasets from a data source 440, each dataset of the plurality of datasets including one or more data types. In some embodiments, the raw source dataset is received from a data source 440. In certain embodiments, the raw source dataset includes a plurality of raw datasets, such as a first source dataset and a second source dataset. In some examples, the first source dataset is received from the data source 440A and the second source dataset is received from the data source 440B. In certain embodiments, the first source dataset has a data structure different from the data structure of the second source dataset.

According to certain embodiments, the data harmonization system 410 and/or the data harmonization processor 420 is configured to select a target schema from the one or more target schemas. In some embodiments, the selected target schema includes a plurality of standardized data structures. In certain embodiments, each standardized data structure of the plurality of standardized data structures includes one or more standardized variables.

According to some embodiments, the data harmonization system 410 and/or the data harmonization processor 420 maps one dataset of the plurality of datasets to one standardized data structure of the plurality of standardized data structures in the selected target schema using one or more dataset mapping rules. In certain embodiments, the data harmonization system 410 and/or the data harmonization processor 420 is configured to match the raw source dataset to one target schema, which is selected from one or more target schemas. In some embodiments, the data harmonization system 410 and/or the data harmonization processor 420 is configured to select one target schema from the one or more target schemas based at least in part on a domain, for example, a domain identified from the raw source dataset. In certain embodiments, the data harmonization system 410 and/or the data harmonization processor 420 is configured to select one target schema from the one or more target schemas based at least in part on inputs including, for example, user inputs, inputs via software interfaces (e.g., application programming interfaces (APIs), web service interfaces, etc.).

In some embodiments, the data harmonization system 410 and/or the data harmonization processor 420 is configured to select one target schema from the one or more target schemas stored in one or more data repository and/or via one or more software interfaces. In certain embodiments, the data harmonization system 410 and/or the data harmonization processor 420 is configured to select one target schema from one or more target schemas using one or more computational models.

In certain embodiments, a raw dataset includes one or more data types. In some embodiments, the target schema includes one or more standardized data structures (e.g., one or more standardized tables). In certain embodiments, the target schema includes one or more standardized variables (e.g., one or more standardized columns). In some embodiments, the target schema includes one or more standardized contents (e.g., one or more standardized content values, one or more standardized codes, etc.).

According to certain embodiments, the data harmonization system 410 and/or the data harmonization processor 420 is configured to map the one or more data types in the one dataset to the one or more standardized variables in the one standardized data structure using one or more variable mapping rules. In some embodiments, the raw source dataset includes a plurality of source datasets including, for example, a first source dataset and a second source dataset. In certain embodiments, a standardized data structure includes at least one standardized variable of the one or more standardized variables.

According to some embodiments, the data harmonization system 410 and/or the data harmonization processor 420 maps the plurality of source datasets to the plurality of standardized data structures in the target schema. In certain embodiments, the data harmonization system 410 and/or the data harmonization processor 420 maps the plurality of source datasets to the plurality of standardized data structures in the target schema using a set of dataset mapping rules. In some embodiments, the first source dataset is different from the second source dataset. In certain embodiments, the data harmonization system 410 and/or the data harmonization processor 420 maps the first source dataset to a standardized data structure and the second source dataset to the same standardized data structure.

According to certain embodiments, the data harmonization system 410 and/or the data harmonization processor 420 is configured to transform the plurality of data types in the raw source dataset to the one or more standardized variables. In some embodiments, the data harmonization system 410 and/or the data harmonization processor 420 is configured to transform the plurality of data types in the raw source dataset to the one or more standardized variables using a set of variable mapping rules. In certain embodiments, at least one dataset mapping rule in the set of dataset mapping rules is different from any one variable mapping rule in the set of variable mapping rules. In some embodiments, the data harmonization system 410 and/or the data harmonization processor 420 is configured to apply one variable mapping rule to at least two datasets in the raw source datasets. In certain embodiments, the data harmonization system 410 and/or the data harmonization processor 420 is configured to apply two or more variable mapping rules to at least two datasets in the raw source datasets.

According to some embodiments, the one or more standardized data structures include a plurality of standardized data structure and the set of variable mapping rules include a variable mapping rule associated with at least two of the plurality of standardized data structures. In some embodiments, the data harmonization system 410 and/or the data harmonization processor 420 is configured to map one or more raw contents in the raw source dataset to the one or more standardized contents. In certain embodiments, the data harmonization system 410 and/or the data harmonization processor 420 is configured to map one or more raw contents in the raw source dataset to the one or more standardized contents using a set of content mapping rules.

In some embodiments, the one or more standardized variables include a plurality of standardized variables, and the set of content mapping rules include a content mapping rule associated with at least two of the plurality of standardized variables. In certain embodiments, one content mapping rule of the set of content mapping rules is associated with at least two of the plurality of standardized data structures. In some embodiments, the data harmonization system 410 and/or the data harmonization processor 420 is configured to apply one or more content mapping rules in the set of content mapping rules to at least two data types (e.g., variables) in the raw source datasets. In certain embodiments, the data harmonization system 410 and/or the data harmonization processor 420 is configured to apply one or more content mapping rules in the set of content mapping rules to at least two datasets in the raw source datasets. In some embodiments, the data harmonization system 410 and/or the data harmonization processor 420 is configured to map raw textual content in the raw source dataset to one standardized content of one or more standardized contents.

In some embodiments, the repository 430 can include target schemas, multiple levels of data mapping rules including dataset mapping rules, variable mapping rules, and content mapping rules, source datasets, standardized data structures, standardized variables, standardized contents, and/or the like. The repository 430 may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

In some cases, various components in the data harmonization environment 400 can execute software or firmware stored in non-transitory computer-readable medium to implement various processing steps. Various components and processors of the data harmonization environment 400 can be implemented by one or more computing devices including, but not limited to, circuits, a computer, a cloud-based processing unit, a processor, a processing unit, a microprocessor, a mobile computing device, and/or a tablet computer. In some cases, various components of the data harmonization environment 400 (e.g., the data harmonization system 410, the data harmonization processor 420, one or more data sources 440) can be implemented on a shared computing device. Alternatively, a component of the data harmonization environment 400 can be implemented on multiple computing devices. In some implementations, various modules and components of the data harmonization environment 400 can be implemented as software, hardware, firmware, or a combination thereof. In some cases, various components of the image scoring environment 400 can be implemented in software or firmware executed by a computing device.

Various components of the data harmonization environment 400 can communicate via or be coupled to via a communication interface, for example, a wired or wireless interface. The communication interface includes, but is not limited to, any wired or wireless short-range and long-range communication interfaces. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

FIG. 5 is a user interface for an example target schema management tool 500, according to certain embodiments of the present disclosure. FIG. 5 is merely an example. One of ordinary skill in the art would recognize many variations, alternatives, and modifications. The embodiments corresponding to FIG. 5 can be combined, modified, and/or substituted by one or more other embodiments described herein. According to some embodiments, one or more users may import, create, and/or edit a desired target schema including, for example, one or more standardized data structures (e.g., standardized datasets), one or more standardized variables (e.g., standardized columns), and/or one or more standardized content values. In certain embodiments, the target schema management tool 500 includes inputs and/or controls 530 to define, select, modify, and/or delete standardized variables for a data structure. In some embodiments, the target schema management tool 500 includes inputs and/or controls 532 to define, select, modify, and/or delete standardized content values for a variable (e.g., a data column). In certain embodiments, the generated schema is used in the one or more mapping tools as the targets which data will be mapped into.

FIG. 6 is a user interface for an example mapping tool 600 (e.g., a dataset and variable mapping tool), according to certain embodiments of the present disclosure. FIG. 6 is merely an example. One of ordinary skill in the art would recognize many variations, alternatives, and modifications. The embodiments corresponding to FIG. 6 can be combined, modified, and/or substituted by one or more other embodiments described herein. In some embodiments, the mapping tool 600 includes a user interface to add, edit, modify, and/or delete dataset mapping rules (e.g., data structure mapping rules).

According to some embodiments, the mapping tool 600 and/or the data harmonization system are configured to generate, edit, modify, and/or delete mapping rules including dataset mapping rules or variable mapping rules via user inputs. In certain embodiments, the mapping tool 600 and/or the data harmonization system are configured to generate, edit, modify, and/or delete mapping rules including dataset mapping rules or variable mapping rules via inputs from software interfaces (e.g., application programming interfaces (APIs), web services, etc.). In some embodiments, the mapping tool 600 and/or the data harmonization system are configured to generate, edit, modify, and/or delete mapping rules including dataset mapping rules or variable mapping rules via computational models.

According to certain embodiments, the dataset mapping rules include a rule to map a dataset (e.g., patient dataset) to a standardized data structure (e.g., a standardized table, a person table). In some embodiments, the dataset mapping rules include a rule to merge two or more datasets to a standardized data structure. In certain embodiments, the dataset mapping rules include a rule to map a dataset to two or more standardized data structures. In some embodiments, the mapping tool 600 defines sets of rules which map raw source datasets to their matching standardized data structures (e.g., with standard dataset names). In certain embodiments, the mapping tool 600 is configured to match the raw datasets into standardized tables (e.g., standardized data structures) associated with a pre-defined schema.

According to some embodiments, the mapping tool 600 includes a user interface to add, edit, modify, and/or delete variable mapping rules (e.g., column mapping rules). In certain embodiments, the column mapping rules include a rule to map a data type (e.g., a source column, names, addresses, streets) to a standardized variable (e.g., a standardized column, a name column). In some embodiments, the column mapping rules include a rule to merge two or more data types to a standardized variable (e.g., a standardized column). In certain embodiments, the dataset mapping rules include a rule to map a data type to two or more standardized variables. In some embodiments, the mapping tool 600 defines sets of rules which map raw source data types (e.g., source columns) into standardized target variables. In certain embodiments, the mapping tool 600 is configured to match raw source data types with pre-defined variables in the standardized table in the target schema.

According to certain embodiments, the mapping tool 600 explores rules, data, and/or configurations either from the source datasets perspective, or from the target schema perspective. In some embodiments, the mapping tool 600 identifies gaps (e.g., missing data structures, missing variables) in the target schema. In certain embodiments, the mapping tool 600 identifies missing data structures and/or missing variables in the target schema based at least in part upon inputs (e.g., user inputs, system inputs). In some embodiments, the mapping tool 600 is configured to identify missing data structures and/or missing variables by analyzing and/or reviewing proposed schemas (e.g., candidate target schemas), for example, based at least in part upon the raw datasets.

According to some embodiments, the mapping tool 600 and/or the data harmonization system are configured to separate dataset mapping rules (e.g., data structure mapping rules) from variable mapping rules (e.g., column mapping rules), for example, to achieve higher efficiency. In certain embodiments, the mapping tool 600 and/or the data harmonization system is configured to define rules for finding and matching datasets to standardized target schema (e.g., corresponding to target domains), separately from the rules which find and match columns to standardized target variables. In some embodiments, the separation of dataset mapping rules from variable mapping rules enables scaling of rules sets, for example, in cases where the same column name appears in multiple different datasets (e.g., a patient table including a name column, a doctor table including a name column, etc.). In certain embodiments, the mapping tool 600 and/or the data harmonization system does not need to define different variable rules for each data structure (e.g., dataset:column). In some embodiments, a variable mapping rule applies to two or more data structures (e.g., two or more standardized tables, two or more datasets, all datasets). For example, the variable "SUBJECT_ID" may appear in almost all datasets, and the system facilitates creating one single rule for finding all the possible matches to this variable, which then applies to all datasets.

FIG. 7 is a user interface for an example content mapping tool 700, according to certain embodiments of the present disclosure. FIG. 7 is merely an example. One of ordinary skill in the art would recognize many variations, alternatives, and modifications. The embodiments corresponding to FIG. 7 can be combined, modified, and/or substituted by one or more other embodiments described herein. In some embodiments, the content mapping tool 700 includes a user interface to add, edit, modify, and/or delete content mapping rules (e.g., content value mapping rules).

According to certain embodiments, the content mapping tool 700 and/or the data harmonization system enables creating and/or editing of mapping rules to standardize the textual content values contained in the data (e.g., raw datasets). In some embodiments, the content mapping tool 700 and/or the data harmonization system enables creating and/or editing of mapping rules to standardize the textual content values contained in the data (e.g., raw datasets) based at least in part on user inputs. In some embodiments, the content mapping tool 700 and/or the data harmonization system enables creating and/or editing of mapping rules to standardize the textual content values contained in the data (e.g., raw datasets) based at least in part on inputs received from software interface(s) (e.g., application programming interfaces (APIs), web services, etc.). In some embodiments, the content mapping tool 700 and/or the data harmonization system enables creating and/or editing of mapping rules to standardize the textual content values contained in the data (e.g., raw datasets) via computational models (e.g., machine learning (ML) models, deep learning (DL) models, supervised ML models, unsupervised ML models, etc.).

In some embodiments, the content mapping tool 700 and/or the data harmonization system consolidates one or more unique content values per variable and supports the generation of rules which map original source values across datasets to a given standardized target value. In certain embodiments, the content mapping tool 700 and/or the data harmonization system can also define target values within the target schema. For example, while the original data may refer to a gender of a patient as either "female", "woman", "F", "W", "femme", "0", or "1" all to mean the same concept—the content mapping tool 700 and/or the data harmonization system helps consolidate those different representations into a single standard representation ("Female"). In some embodiments, this enables later data analysis to be made on all data at once.

Figure 8:
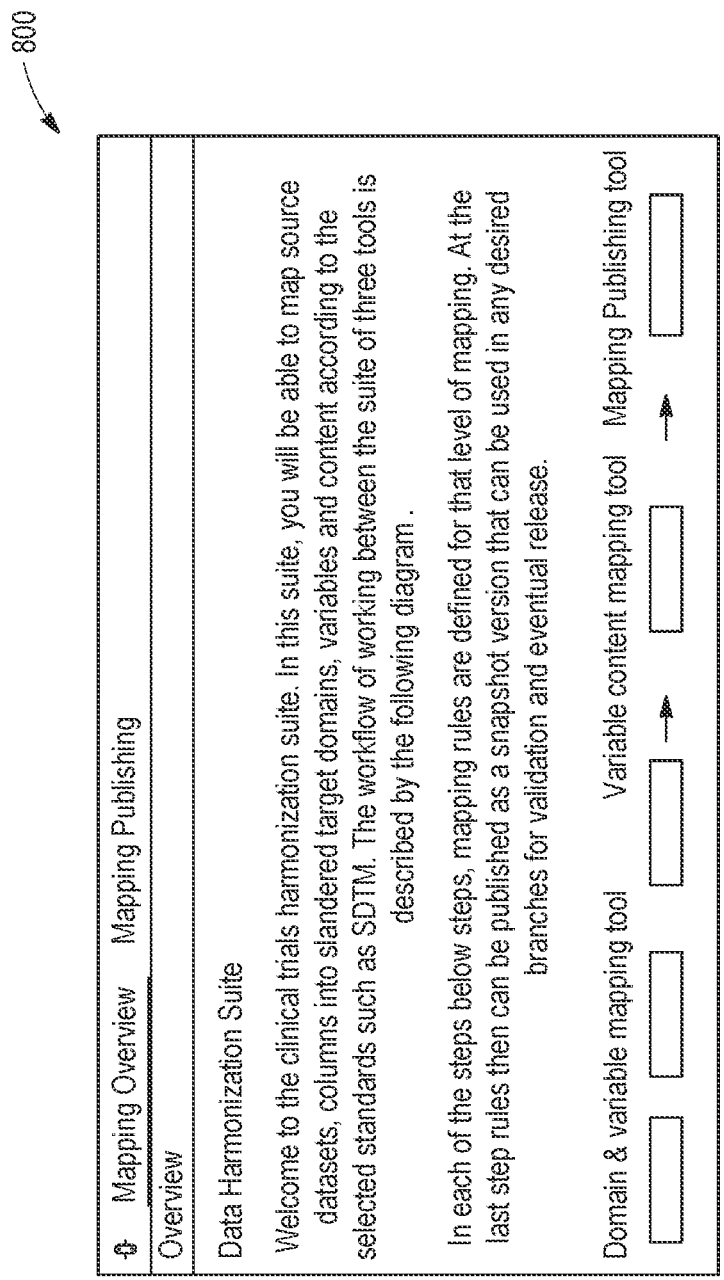
FIG. 8 is a user interface for an example publishing tool, according to certain embodiments of the present disclosure.

FIG. 8 is a user interface for an example publishing tool 800, according to certain embodiments of the present disclosure. FIG. 8 is merely an example. One of ordinary skill in the art would recognize many variations, alternatives, and modifications. The embodiments corresponding to FIG. 8 can be combined, modified, and/or substituted by one or more other embodiments described herein. In some embodiments, the publishing tool 800 includes a user interface to add, edit, modify, and/or delete versions of one or more levels of mapping rules (e.g., dataset mapping rules, variable mapping rules, content mapping rules, etc.).

According to some embodiments, the publishing tool 800 and/or the data harmonization system manage versioning of rules, and be able to apply different versions of rules sets on different data branches. In certain embodiments, the publishing tool 800 and/or the data harmonization system can test (e.g., effectively test) a new version of the set of rules in a separate environment before merging it into the production environment.

According to certain embodiments, the publishing tool 800 and/or the data harmonization system enables users (e.g., teams) to do that, by publishing snapshot versions of the rules corpus, which then can be used flexibly in any desired branch. In some embodiments, rules do not apply on the master production data by default, until it is manually selected to use a newer selected version.

According to some embodiments, the data harmonization system may not need the publishing tool, and the rules may automatically deploy (e.g., flow) to apply to the raw source dataset (e.g., main data, master data branch). In certain embodiments, the data harmonization system (e.g., the data harmonization suite) can be deployed at scale, for example, to map more than 50,000 datasets, 3 million columns, and 12 billion content values, representing more than 3000 datasets (e.g., clinical trial datasets). In some embodiments, the data harmonization system can unlock significant added value and new insights by enabling cross-data-source (e.g., cross-trial) data harmonization.

Figure 9:
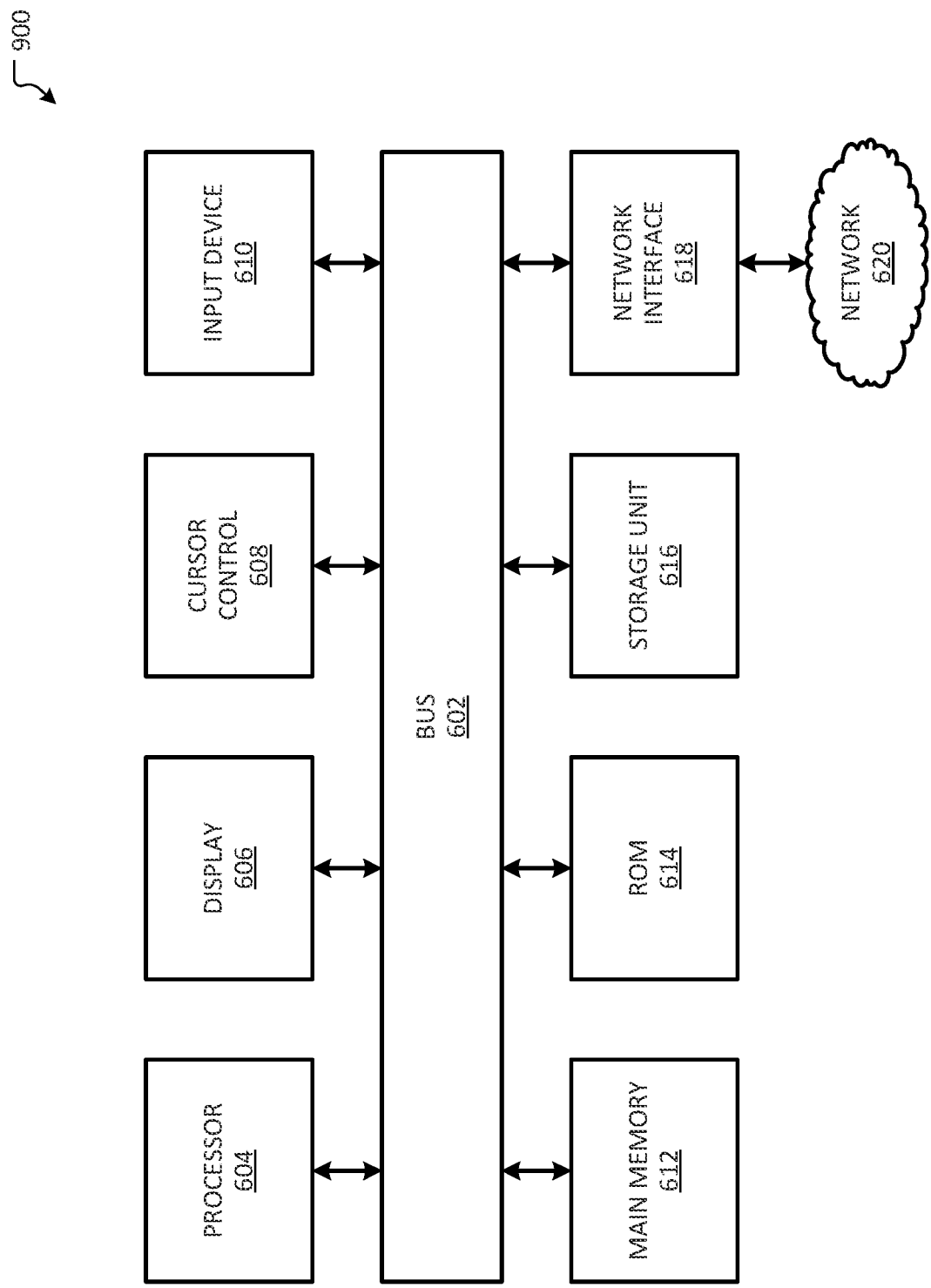
FIG. 9 is a simplified diagram showing a computing system for implementing a system for data harmonization in accordance with at least one example set forth in the disclosure.

FIG. 9 is a simplified diagram showing a computing system for implementing a system 900 for data harmonization in accordance with at least one example set forth in the disclosure. This diagram is merely an example, which should not unduly limit the scope of the claims. One of ordinary skill in the art would recognize many variations, alternatives, and modifications.

The computing system 900 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the methods 100, and/or the method 200 are performed by the computing system 900. In some examples, the bus 602 is coupled to the processor 604, the display 606, the cursor control component 608, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 900 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 900. In some examples, the input device 610 (e.g., alphanumeric and other keys) is configured to communicate information and commands to the processor 604. For example, the cursor control component 608 (e.g., a mouse, a trackball, or cursor direction keys) is configured to communicate additional information and commands (e.g., to control cursor movements on the display 606) to the processor 604.

According to certain embodiments, a method for data harmonization for a domain, the method comprising: receiving a raw source dataset including one or more data types; matching the raw source dataset to a target schema corresponding to the domain, the target schema including one or more standardized variables; and transforming the one or more data types in the raw source dataset to the one or more standardized variables; wherein the method is performed using one or more processors. For example, the method is implemented according to at least FIG. 1, FIG. 2, FIG. 3, and/or FIG. 4.

In some embodiments, the receiving a raw source dataset comprises receiving a plurality of source datasets, where the matching the raw source dataset to a target schema comprises mapping the plurality of source datasets to a plurality of standardized data structures in the target schema, and where each standardized data structure includes at least one standardized variables of the one or more standardized variables. In certain embodiments, the mapping the plurality of source datasets to a plurality of standardized data structures in the target schema comprises mapping the plurality of source datasets to the plurality of standardized data structures in the target schema using a set of dataset mapping rules, where the transforming the one or more data types in the raw source dataset to the one or more standardized variables comprises transforming the one or more data types in the raw source dataset to the one or more standardized variables using a set of variable mapping rules, and where at least one dataset mapping rule in the set of dataset mapping rules is different from any one variable mapping rule in the set of variable mapping rules. In some embodiments, the set of variable mapping rules include a variable mapping rule associated with at least two of the plurality of standardized data structures.

In certain embodiments, the method further comprises: mapping one or more raw contents in the raw source dataset to one or more standardized contents using a set of content mapping rules. In some embodiments, the one or more standardized variables including a plurality of standardized variables, wherein the set of content mapping rules include a content mapping rule associated with at least two of the one or more standardized variables. In certain embodiments, one content mapping rule in the set of content mapping rules is associated with at least two of the plurality of standardized data structures. In some embodiments, the method further comprises: mapping a raw textual content in the raw source dataset to one standardized content of one or more standardized contents. In certain embodiments, the method further comprises: receiving one or candidate target schemas; where the matching the raw source dataset to a target schema corresponding to a domain comprises: selecting the target schema from the one or more candidate target schemas based at least in part on the raw source dataset.

According to some embodiments, a system for data harmonization for a domain, the system comprising: one or more memories storing instructions thereon; one or more processors configured to execute the instructions and perform operations comprising: receiving a raw source dataset including one or more data types; matching the raw source dataset to a target schema corresponding to the domain, the target schema including one or more standardized variables; and transforming the one or more data types in the raw source dataset to the one or more standardized variables. For example, the system is implemented according to at least FIG. 1, FIG. 2, FIG. 3, and/or FIG. 4.

In some embodiments, the receiving a raw source dataset comprises receiving a plurality of source datasets, where the matching the raw source dataset to a target schema comprises mapping the plurality of source datasets to a plurality of standardized data structures in the target schema, and where each standardized data structure includes at least one standardized variables of the one or more standardized variables. In certain embodiments, the mapping the plurality of source datasets to a plurality of standardized data structures in the target schema comprises mapping the plurality of source datasets to the plurality of standardized data structures in the target schema using a set of dataset mapping rules, where the transforming the one or more data types in the raw source dataset to the one or more standardized variables comprises transforming the one or more data types in the raw source dataset to the one or more standardized variables using a set of variable mapping rules, and where at least one dataset mapping rule in the set of dataset mapping rules is different from any one variable mapping rule in the set of variable mapping rules. In some embodiments, the set of variable mapping rules include a variable mapping rule associated with at least two of the plurality of standardized data structures.

In certain embodiments, the method further comprises: mapping one or more raw contents in the raw source dataset to one or more standardized contents using a set of content mapping rules. In some embodiments, the one or more standardized variables including a plurality of standardized variables, wherein the set of content mapping rules include a content mapping rule associated with at least two of the one or more standardized variables. In certain embodiments, one content mapping rule in the set of content mapping rules is associated with at least two of the plurality of standardized data structures. In some embodiments, the method further comprises: mapping a raw textual content in the raw source dataset to one standardized content of one or more standardized contents. In certain embodiments, the method further comprises: receiving one or candidate target schemas; where the matching the raw source dataset to a target schema corresponding to a domain comprises: selecting the target schema from the one or more candidate target schemas based at least in part on the raw source dataset.

According to certain embodiments, a method for data harmonization, the method comprising: receiving a plurality of source datasets including one or more data types; receiving a target schema, the target schema including one or more standardized variables; mapping the plurality of source datasets to the plurality of standardized data structures in the target schema using a set of dataset mapping rules, and transforming the one or more data types in the plurality of source datasets to the one or more standardized variables using a set of variable mapping rules, at least one dataset mapping rule in the set of dataset mapping rules being different from any variable mapping rule in the set of variable mapping rules; wherein the method is performed using one or more processors. For example, the method is implemented according to at least FIG. 1, FIG. 2, FIG. 3, and/or FIG. 4.

In some embodiments, the set of variable mapping rules include a variable mapping rule associated with at least two of the plurality of standardized data structure.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, while the embodiments described above refer to particular features, the scope of the present disclosure also includes embodiments having different combinations of features and embodiments that do not include all of the described features. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system (e.g., one or more components of the processing system) to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented, for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments. Various modifications and alterations of the disclosed embodiments will be apparent to those skilled in the art. The embodiments described herein are illustrative examples. The features of one disclosed example can also be applied to all other disclosed examples unless otherwise indicated. It should also be understood that all U.S. patents, patent application publications, and other patent and non-patent documents referred to herein are incorporated by reference, to the extent they do not contradict the foregoing disclosure.

What is claimed is:

1. A method for data harmonization of medical data, the method comprising:
    receiving a raw source dataset including one or more data types, the raw source dataset including a plurality of source datasets of medical data;
    identifying a domain based on the raw source dataset, the domain indicating an industry or an organization;
    receiving one or more candidate target schemas;
    matching the raw source dataset to a target schema corresponding to the identified domain, the target schema including one or more standardized variables, wherein the matching the raw source dataset to a target schema corresponding to the identified domain comprises:
        selecting the target schema from the one or more candidate target schemas based at least in part on the raw source dataset and the identified domain by one or more computational models; and
        mapping the plurality of source datasets to a plurality of standardized data structures in the target schema using a set of dataset mapping rules, at least one dataset mapping rule being associated with one of the plurality of standardized data structures; and
    mapping the one or more data types in the raw source dataset to the one or more standardized variables using a set of variable mapping rules, wherein the set of variable mapping rules include a variable mapping rule associated with a first standardized data structure and a second standardized data structure of the plurality of standardized data structures, wherein the first standardized data structure includes a specific standardized variable that is not in the second standardized data structure, wherein the variable mapping rule is applied to at least two source datasets of the plurality of source datasets, wherein the at least two source datasets of the plurality of source datasets include a same data type;

wherein at least one dataset mapping rule in the set of dataset mapping rules is different from any one variable mapping rule in the set of variable mapping rules;

wherein the method is performed using one or more processors.

2. The method of claim 1, wherein each standardized data structure includes at least one standardized variable of the one or more standardized variables.

3. The method of claim 1, wherein the set of variable mapping rules include a variable mapping rule associated with at least three of the plurality of standardized data structures.

4. The method of claim 1, further comprising:
mapping one or more raw contents in the raw source dataset to one or more standardized contents using a set of content mapping rules.

5. The method of claim 4, wherein the one or more standardized variables including a plurality of standardized variables, wherein the set of content mapping rules include a content mapping rule associated with at least two of the one or more standardized variables.

6. The method of claim 5, wherein one content mapping rule in the set of content mapping rules is associated with at least two of the plurality of standardized data structures.

7. The method of claim 1, further comprising:
mapping a raw textual content in the raw source dataset to one standardized content of one or more standardized contents.

8. A system for data harmonization of medical data, the system comprising:
one or more memories storing instructions thereon;
one or more processors configured to execute the instructions and perform operations comprising:
receiving a raw source dataset including one or more data types, the raw source dataset including a plurality of source datasets of medical data;
identifying a domain based on the raw source dataset, the domain indicating an industry or an organization;
receiving one or more candidate target schemas;
matching the raw source dataset to a target schema corresponding to the identified domain, the target schema including one or more standardized variables, wherein the matching the raw source dataset to a target schema corresponding to the identified domain comprises:
selecting the target schema from the one or more candidate target schemas based at least in part on the raw source dataset and the identified domain by one or more computational models; and
mapping the plurality of source datasets to a plurality of standardized data structures in the target schema using a set of dataset mapping rules, at least one dataset mapping rule being associated with one of the plurality of standardized data structures; and
mapping the one or more data types in the raw source dataset to the one or more standardized variables using a set of variable mapping rules, wherein the set of variable mapping rules include a variable mapping rule associated with a first standardized data structure and a second standardized data structure of the plurality of standardized data structures, wherein the first standardized data structure includes a specific standardized variable that is not in the second standardized data structure, wherein the variable mapping rule is applied to at least two source datasets of the plurality of source datasets, wherein the at least two source datasets of the plurality of source datasets include a same data type;
wherein at least one dataset mapping rule in the set of dataset mapping rules is different from any one variable mapping rule in the set of variable mapping rules.

9. The system of claim 8, wherein each standardized data structure includes at least one standardized variable of the one or more standardized variables.

10. The system of claim 8, wherein the set of variable mapping rules include a variable mapping rule associated with at least three of the plurality of standardized data structures.

11. The system of claim 8, wherein the operations further comprise:
mapping one or more raw contents in the raw source dataset to one or more standardized contents using a set of content mapping rules.

12. The system of claim 11, wherein the one or more standardized variables include a plurality of standardized variables, wherein the set of content mapping rules include a content mapping rule associated with at least two of the one or more standardized variables.

13. The system of claim 12, wherein one content mapping rule in the set of content mapping rules is associated with at least two of the plurality of standardized data structures.

14. The system of claim 8, wherein the operations further comprise:
mapping a raw textual content in the raw source dataset to one standardized content of one or more standardized contents.

* * * * *